L. MEHLBERGER.
FENDER FOR MOTOR VEHICLES.
APPLICATION FILED APR. 7, 1922.
1,438,844.
Patented Dec. 12, 1922.
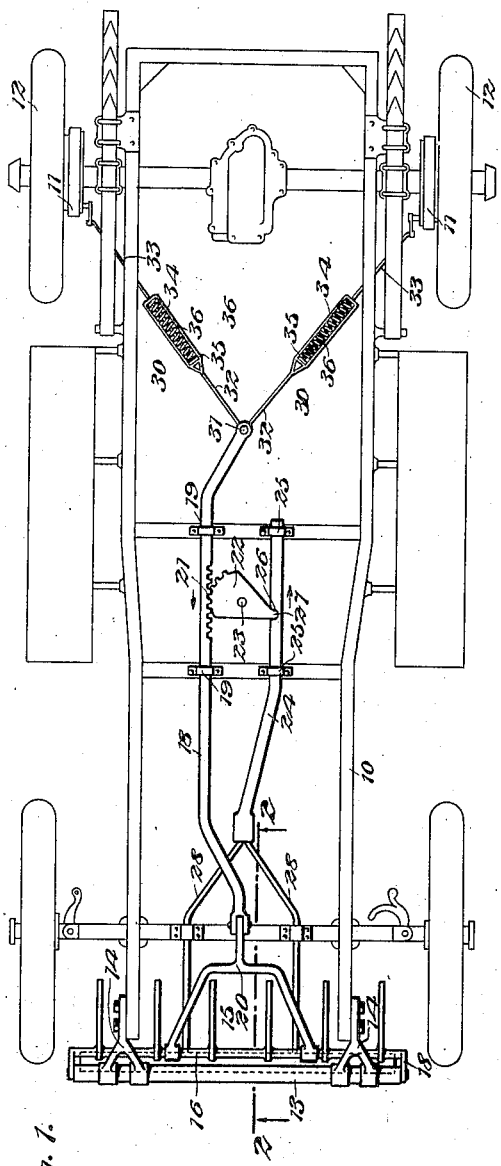
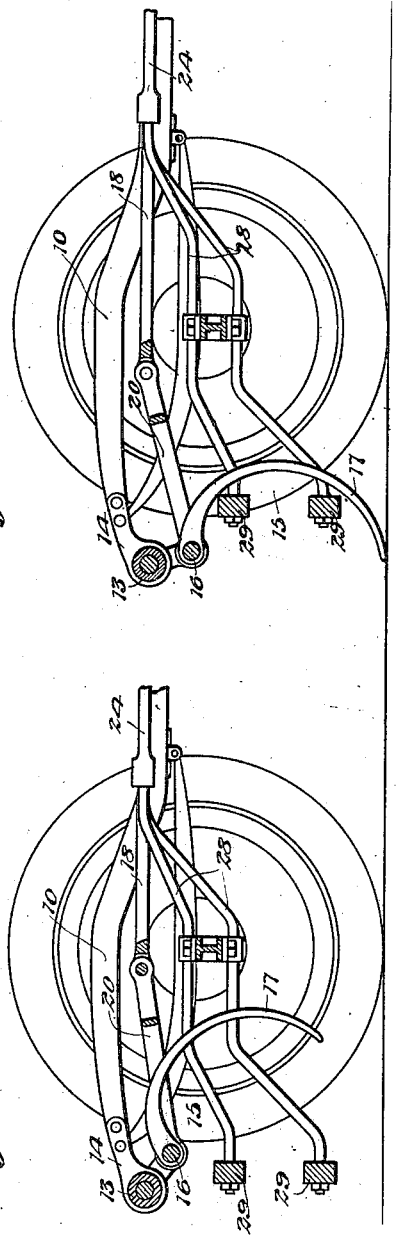
WITNESSES
INVENTOR
L. Mehlberger
ATTORNEYS Patented Dec. 12, 1922.

1,438,844

UNITED STATES PATENT OFFICE.

LOUIS MEHLBERGER, OF DETROIT, MICHIGAN.

FENDER FOR MOTOR VEHICLES.

Application filed April 7, 1922. Serial No. 550,352.

*To all whom it may concern:*

Be it known that I, LOUIS MEHLBERGER, a citizen of Bavaria, and a resident of Detroit, in the county of Wayne and State of Michigan, have invented a new and Improved Fender for Motor Vehicles, of which the following is a full, clear, and exact description.

This invention has relation to an attachment for motor vehicles and refers more particularly to a fender therefor.

The invention contemplates a fender for motor vehicles which is normally disposed in an out-of-the-way position and automatically brought into operative position by virtue of an actuating means upon contact of said means with a pedestrian.

Furthermore the invention contemplates in connection with the fender, means operable upon movement of the fender to operative position for applying the brakes of the vehicle in order to retard its momentum in event of the operator's failure to apply the brakes.

The invention further contemplates a fender and actuating means therefor of the character described which is combined with a bumper in such a manner as to be protected thereby upon contact of the bumper with another vehicle.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a plan view of the fender, buffer and brake actuating means associated with a motor vehicle.

Fig. 2 is a fragmentary longitudinal sectional view therethrough taken approximately on the line 2—2 of Fig. 1, and illustrating the normal arrangement of the parts.

Fig. 3 is a similar view illustrating the arrangement of parts when actuated to operative position.

Referring to the drawings by characters of reference, 10 designates the chassis of a motor vehicle and 11 the brakes operating on the rear wheels 12 thereof. A buffer bar 13 is supported transversely from the forward end of the chassis by means of brackets 14 and said bumper bar constitutes a pivot or fulcrum for the fender 15. The fender 15 consists of a transverse bar 16 and a plurality of arcuate fender arms 17 secured at one extremity to the transverse bar or formed integrally. The transverse bar 16 is provided at its opposite ends with extensions 18 which are pivoted to the buffer bar to permit of the swinging of the fender from the raised position illustrated in Fig. 2 to the lowered position illustrated in Fig. 3, in which latter position the free extremities of the fender arms are disposed in contact with the road bed or surface. The actuating means for swinging the fender to operative position includes a slide bar 18ª mounted in guides 19 secured to the chassis having connection at one extremity by a forked link 20 to the cross bar 16 of the fender, rack teeth 21 on the slide bar and a segmental rack 22 engageable with the rack teeth 21, which segmental rack is rotatably supported as at 23 from the under side of the car. The actuating means further includes a push rod 24 mounted in guides 25 secured to the chassis and provided with a single notch 26 engageable with a finger 27 on the segmental rack 22. The push rod is provided with forked arms 28 at its forward extremity which are connected to contact rails 29 projecting forwardly from the chassis and disposed beneath the buffer bar 13 and slightly in rear thereof. Under this arrangement the buffer bar 13 serves to prevent damage to the fender or contact rails upon striking a heavy object such as another vehicle, tree, fence, or the like, while the contact rails upon striking a pedestrian move push rod 24 rearwardly, thereby turning the segmental rack 22 on its pivot and shifting the slide bar 18ª forwardly to lower the fender arms to a position to prevent pedestrians from being run over by the wheels.

In order to provide means for automatically actuating the brakes 11, connecting elements 30 are attached as at 31 to the rear extremity of the slide bar 18 and at their opposite extremities respectively to the actuating arms of the brakes 11. The connecting elements consist of front and rear sections 32 and 33, the former provided with a yoke 34 and the latter with a head 35 between which a tension spring 36 is arranged. Normally the tension of the springs 36 serves to maintain the slide bar 18ª in its rearward shifted position, thereby holding the fender 15 in raised position. When the contact bars are actuated to throw the push rod 24 to the rear and the slide bar 18ª forwardly to lower the fender, a pull is simultaneously exerted on the connecting elements 30 to cause the brakes 11 to retard the momentum of the vehicle and finally bring the same to a stop in event that the driver in the excitement fails to operate the brakes.

In order to reset the fender, the contact bars are grasped and pulled forwardly, thereby simultaneously shifting the push rod forwardly and the slide bar to the rear, thus lifting the fender to its normal position and releasing the brakes.

I claim:

1. A safety attachment for motor vehicles embodying a bumper supported transversely from the forward end of the chassis, a fender pivotally connected thereto for vertical swinging movements, a slide bar mounted for longitudinal sliding movement on the chassis, a link connection between the forward end of the slide bar and the fender, a connection between the rear end of the slide bar and the brakes, an actuating means having contact rails at its forward end disposed in advance of the fender, a connection between the actuating means and the slide bar adapted upon rearward movement of the actuating means to shift the slide bar forwardly for lowering the fender and simultaneously applying the brakes.

2. A safety attachment for motor vehicles comprising in combination with a buffer bar secured to the forward end of the chassis, a fender pivotally attached thereto and disposed in rear thereof, a slide bar connected with the fender at its forward end and operatively connected with the brakes at its rear end for normally retaining the fender in elevated position and the brakes in released position, and actuating means operable upon contact with a pedestrian for shifting the slide bar forwardly to lower the fender and apply the brakes.

3. A safety attachment for motor vehicles comprising in combination with a buffer bar secured to the forward end of the chassis, a fender pivotally attached thereto and disposed in rear thereof, a slide bar connected with the fender at its forward end and operatively connected with the brakes at its rear end for normally retaining the fender in elevated position and the brakes in released position, actuating means operable upon contact with a pedestrian for shifting the slide bar forwardly to lower the fender and apply the brakes, said actuating means consisting of a push rod, contact rails connected to the forward end thereof and disposed beneath and in rear of the bumper bar and in advance of the fender, and a connecting element adapted upon rearward movement of the push rod to shift the slide bar forwardly.

LOUIS MEHLBERGER.